United States Patent
Johnson et al.

(10) Patent No.: US 9,718,398 B2
(45) Date of Patent: Aug. 1, 2017

(54) VEHICLE ILLUMINATION ASSEMBLY WITH ENERGY HARVESTING DEVICE

(71) Applicant: Nissan North America, Inc., Franklin, TN (US)

(72) Inventors: Randall Johnson, White Lake, MI (US); Bhargav Sura, Sterling Heights, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 319 days.

(21) Appl. No.: 14/326,068

(22) Filed: Jul. 8, 2014

(65) Prior Publication Data
US 2016/0010818 A1    Jan. 14, 2016

(51) Int. Cl.
| | |
|---|---|
| F21S 9/04 | (2006.01) |
| B60Q 3/00 | (2017.01) |
| H02N 2/18 | (2006.01) |
| B60Q 1/50 | (2006.01) |
| B60Q 3/82 | (2017.01) |
| B60Q 3/51 | (2017.01) |
| B60Q 3/217 | (2017.01) |
| B60Q 3/30 | (2017.01) |

(52) U.S. Cl.
CPC .......... B60Q 1/503 (2013.01); B60Q 3/217 (2017.02); B60Q 3/30 (2017.02); B60Q 3/51 (2017.02); B60Q 3/82 (2017.02); H02N 2/186 (2013.01)

(58) Field of Classification Search
CPC .... F21L 14/08; F21L 13/00; F21S 9/04; F21S 9/02; H02N 2/186; F21W 2101/08; B60Q 3/0216; B60Q 3/0289; B60Q 2500/10
See application file for complete search history.

(56) References Cited

U.S. PATENT DOCUMENTS

| | | | | |
|---|---|---|---|---|
| 3,239,678 A | * | 3/1966 | Kolm | F23Q 2/287 102/210 |
| 3,389,275 A | * | 6/1968 | Brothers | B64G 9/00 102/210 |
| 5,554,922 A | * | 9/1996 | Kunkel | H02N 2/18 290/4 D |
| 6,008,732 A | * | 12/1999 | Lam | B60Q 1/52 340/425.5 |
| 6,433,465 B1 | * | 8/2002 | McKnight | A43B 3/0005 310/319 |

(Continued)

FOREIGN PATENT DOCUMENTS

EP        2301803 A1    3/2011

OTHER PUBLICATIONS

U.S. Appl. No. 14/197,285, filed Mar. 5, 2014, "Vehicle With an Auxiliary Power Pack".

*Primary Examiner* — Ismael Negron
(74) *Attorney, Agent, or Firm* — Global IP Counselors, LLP (57) ABSTRACT

A vehicle includes a closure panel, a sill protector mounted adjacent to the closure panel, an energy harvesting device configured to convert ambient energy to electrical energy, a storage device electrically connected to the energy harvesting device to store the electrical energy, an illumination member electrically connected to the storage device and configured to be powered by electrical energy supplied from the storage device, and a sensor connected to the sill protector and power the illumination member when movement of the closure panel is detected.

4 Claims, 8 Drawing Sheets

(56) References Cited

U.S. PATENT DOCUMENTS

| | | | |
|---|---|---|---|
| 6,858,970 B2* | 2/2005 | Malkin | H01L 41/1136 310/322 |
| 6,894,460 B2* | 5/2005 | Clingman | H02N 2/181 310/311 |
| 6,933,655 B2 | 8/2005 | Morrison et al. | |
| 6,971,758 B2* | 12/2005 | Inui | G02B 6/0018 362/23.01 |
| 6,984,902 B1* | 1/2006 | Huang | H02N 2/186 310/26 |
| 7,361,998 B2 | 4/2008 | Hamel et al. | |
| 7,383,911 B2* | 6/2008 | Schondorf | B60R 22/48 180/268 |
| 7,605,689 B2 | 10/2009 | Hein et al. | |
| 7,986,076 B2 | 7/2011 | Yoon et al. | |
| 8,143,766 B2* | 3/2012 | Namuduri | B60G 11/04 310/339 |
| 8,292,228 B2 | 10/2012 | Mitchell et al. | |
| 8,459,213 B2 | 6/2013 | Moriarty et al. | |
| 8,702,290 B2* | 4/2014 | Yang | B60Q 3/0216 362/185 |
| 2006/0176158 A1 | 8/2006 | Fleming | |
| 2007/0205881 A1 | 9/2007 | Breed | |
| 2009/0044848 A1 | 2/2009 | Lashmore et al. | |
| 2012/0255349 A1 | 10/2012 | Pop et al. | |
| 2015/0233560 A1* | 8/2015 | Cheng | G02B 6/0068 362/612 |

* cited by examiner

VEHICLE ILLUMINATION ASSEMBLY WITH ENERGY HARVESTING DEVICE

BACKGROUND

Field of the Invention

The present invention generally relates to a self-powered illumination assembly for a vehicle. More specifically, the present invention relates to a self-powered illumination assembly for a vehicle including an energy harvesting device configured to convert ambient energy to electrical energy and a storage device configured to store and supply electrical energy.

Background Information

Passenger vehicles generate vibration energy by movement on a road. The generated vibration energy is wasted when not captured and utilized. Accordingly, a need exists for an energy harvesting device that captures and utilizes vibration energy generated by movement of a vehicle.

SUMMARY

In view of the state of the known technology, one aspect of the present invention includes a self-powered illumination assembly for a vehicle. A sill protector is mounted adjacent to a closure panel. An energy harvesting device is configured to convert ambient energy to electrical energy. A storage device is electrically connected to the energy harvesting device to store the electrical energy. An illumination member is electrically connected to the storage device and is configured to be illuminated by electrical energy supplied from the storage device. A sensor is connected to the sill protector and is configured to supply the stored electrical energy to the illumination member when movement of the closure panel is detected.

Another aspect of the present invention includes a self-powered illumination assembly for a vehicle including a vehicle structure and a microelectromechanical systems (MEMS) array connected to the vehicle structure configured to convert vibration energy to electrical energy. The MEMS array includes a plurality of sensors configured to harvest vibration energy from a plurality of frequency ranges. A storage device is electrically connected to the MEMS array to store the electrical energy. An illumination member is electrically connected to the storage device. A proximity sensor is connected to the MEMS array. The stored electrical energy is supplied to the illumination member by the storage device when activated by the proximity sensor.

Yet another aspect of the present invention includes a method of illuminating an illumination member of a vehicle. Ambient energy is harvested with an energy harvesting device and converts the harvested ambient energy to electrical energy. The electrical energy is stored in a storage device. Movement of a closure panel of the vehicle is sensed with a sensor. The stored electrical energy is supplied to the illumination member to illuminate the illumination member when the sensor is activated by movement of the closure panel from a closed position to an open position.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
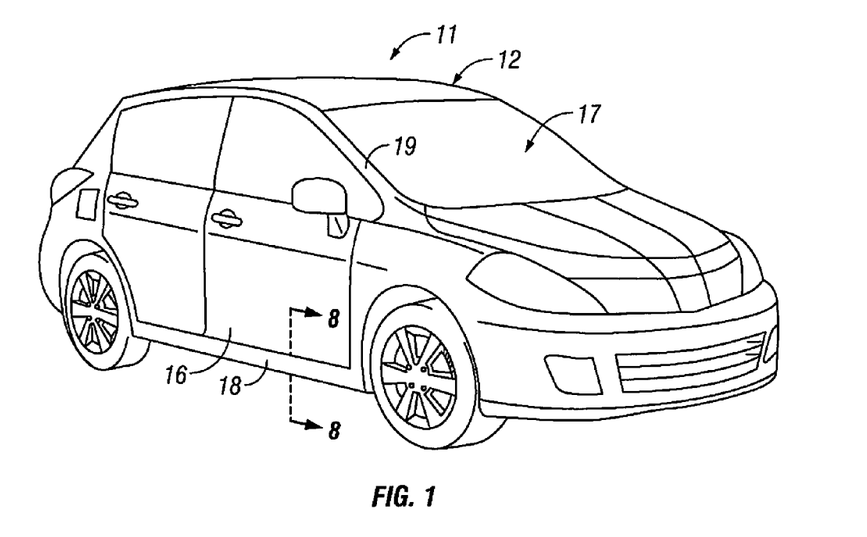
FIG. 1 is a perspective view of a vehicle.
Figure 2:
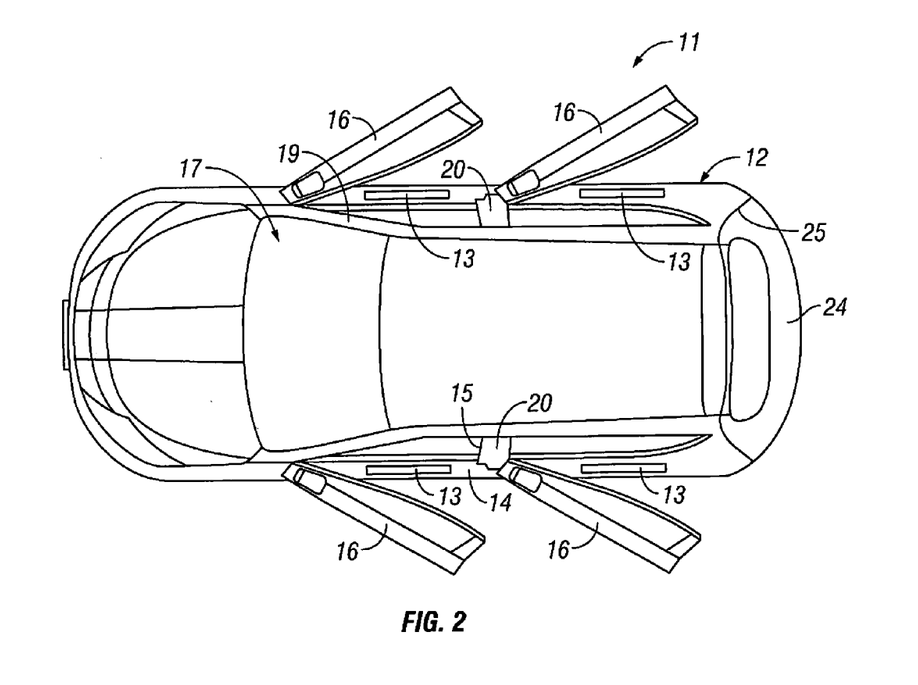
FIG. 2 is a top plan view of the vehicle of FIG. 1.

Referring initially to FIG. 1, a vehicle 11 including a vehicle body structure 12 is illustrated in accordance with an exemplary embodiment of the present invention. As shown in FIG. 2, the vehicle 11 is provided with a plurality of illumination assemblies 13, with one of the illumination assemblies 13 being installed along, for example, a surface 14, where the surface 14 at least partially defines an opening 15 in the vehicle body structure 12. As described below, a plurality of illumination assemblies 13 can be installed at a variety of locations of the vehicle body structure 12.

As described in greater detail below, each of the plurality of illumination assemblies 13 is configured to be illuminated, for example, when a door 16 that closes the opening 15, is moved from a closed position (FIG. 1) to an open position (FIG. 2) or when one of the illumination assemblies is touched. In the closed position, the door 16 covers the illumination assembly 13 installed to the surface 14 and in the open position, the door 16 exposes the illumination assembly 13 installed to the surface 14.

A brief description of the vehicle 10 is now provided with specific reference to FIGS. 1-4. The vehicle 10 includes, among other things, a passenger compartment 17 that is at least partially defined by elements of the vehicle body structure 12. Specifically, the vehicle body structure 12 includes a sill structure 18, an A-pillar structure 19, a B-pillar structure 20 and the door 16. The sill structure 18, the A-pillar structure 19 and the B-pillar structure 20 at least partially define the opening 15.

The door 16 is pivotally attached to the A-pillar structure 19 for movement between the closed position (FIGS. 1 and 3) and the open position (FIG. 2), in a conventional manner. The door 16 is one example of a closure panel of the vehicle 10 that moves between open and closed positions.

Figure 3:
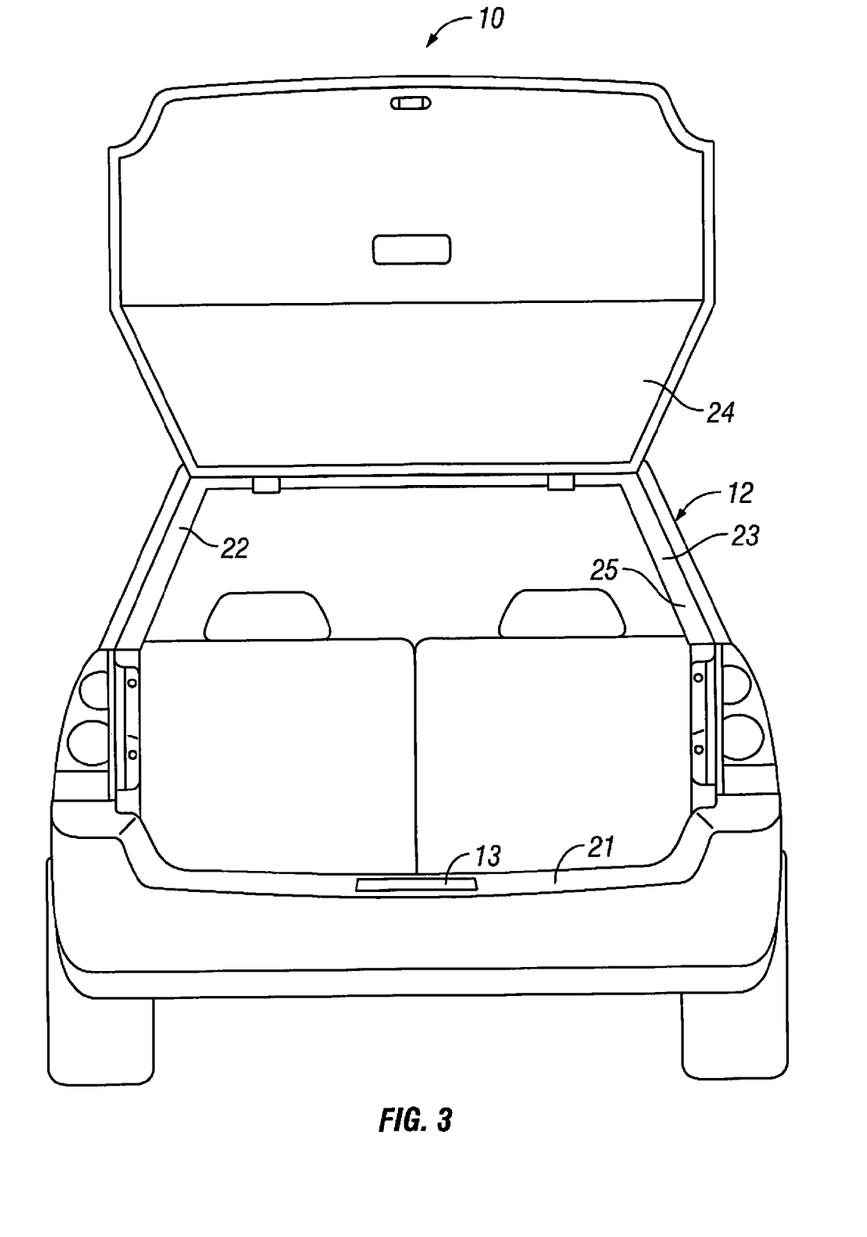
FIG. 3 is a rear elevation view of the vehicle of FIG. 1 with a rear hatch door in an open position.
Figure 4:
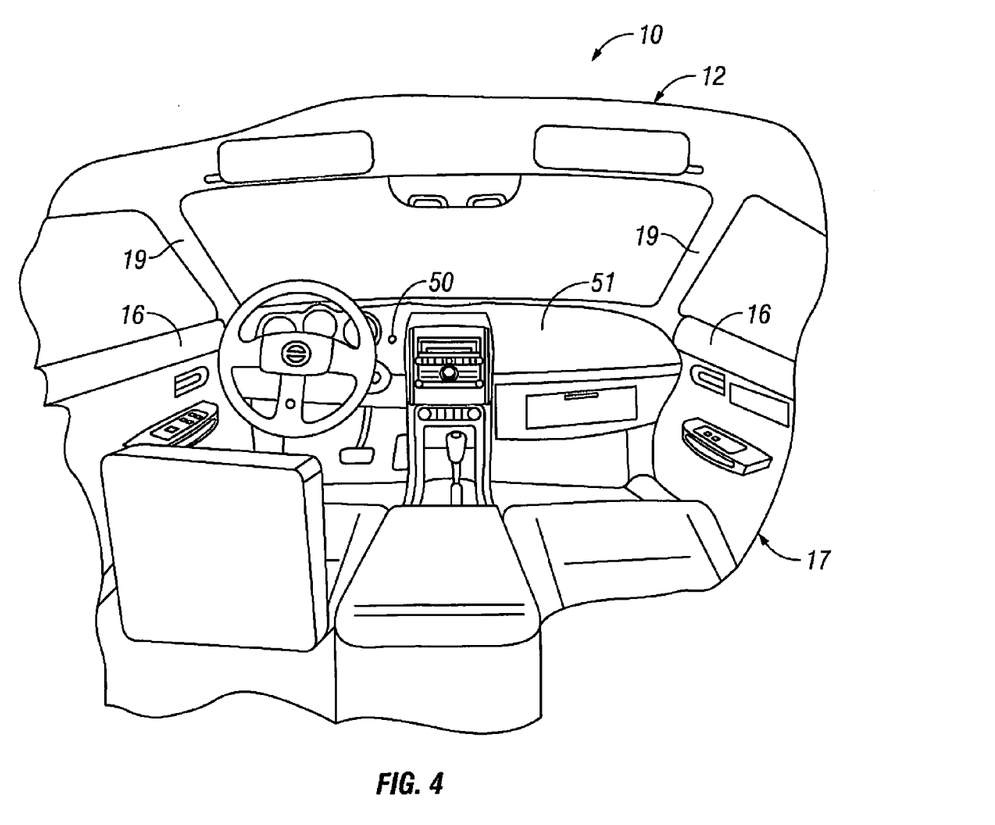
FIG. 4 is a rear perspective view of a passenger compartment of the vehicle of FIG. 1.

Further, as shown in FIG. 3, the vehicle body structure 12 includes a rear sill structure 21, a first rear pillar structure 22, a second rear pillar structure 23, and a rear hatch door 24.

The rear sill structure 21, the first rear pillar structure 22 and the second rear pillar structure 23 define a rear hatch opening 25.

The sill structure 18 includes a plurality of members (not shown) that are welded or otherwise rigidly fixed to one another in a conventional manner. As shown in FIGS. 1 and 2, the sill structure 18 includes the surface 14 having a first edge extending along an exterior portion of the vehicle 10 and a second edge opposite the first edge extending along an interior portion of the passenger compartment 17 of the vehicle 10. As clearly shown in FIGS. 1 and 2, the surface 14 at least partially defines the opening 15. The A-pillar structure 19 is similarly constructed from a plurality of panels (not shown) that are welded together in a conventional manner. The door 16 (the closure panel) is movably coupled relative to the surface 14 for movement between the open position exposing the surface 14 and the closed position covering the surface 14.

Similarly, the rear sill structure 21 includes a plurality of members (not shown) that are welded or otherwise rigidly fixed to one another in a conventional manner. The rear hatch door 24 is pivotally attached to a rear roof structure of the vehicle body structure 12 for movement between a closed position (FIGS. 1 and 2) and an open position (FIG. 3). The rear hatch door 24 is another example of a closure panel of the vehicle 10 that moves between open and closed positions.

The illumination assembly 13 can be connected to any suitable location of the vehicle structure 12, such as, but not limited to, the surface 14 of the sill structure 18 corresponding to the left and right front and rear doors 16 and the rear sill structure (rear bumper) 21. The illumination assembly 13 is attached to the surface 14 of the sill structure 18 and to the surface of the rear sill structure 21 by any of a variety of attachment structures, such as, but not limited to, removable threaded fasteners (not shown), snap-fitting fasteners 25 (FIG. 7), or in any other suitable manner.

Figure 5:
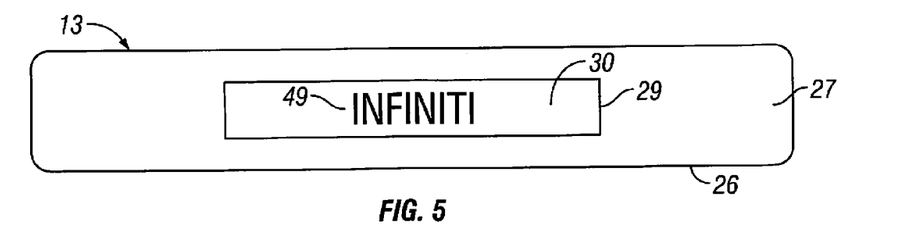
FIG. 5 is a top plan view of an illumination assembly in accordance with an exemplary embodiment of the present invention.
Figure 6:
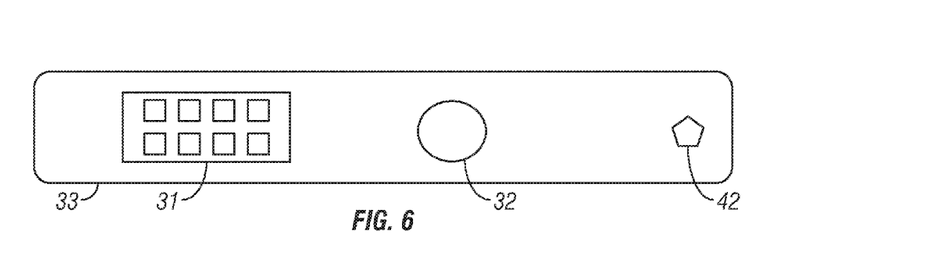
FIG. 6 is a top plan view of the illumination assembly of FIG. 5 with a sill protector removed.
Figure 7:
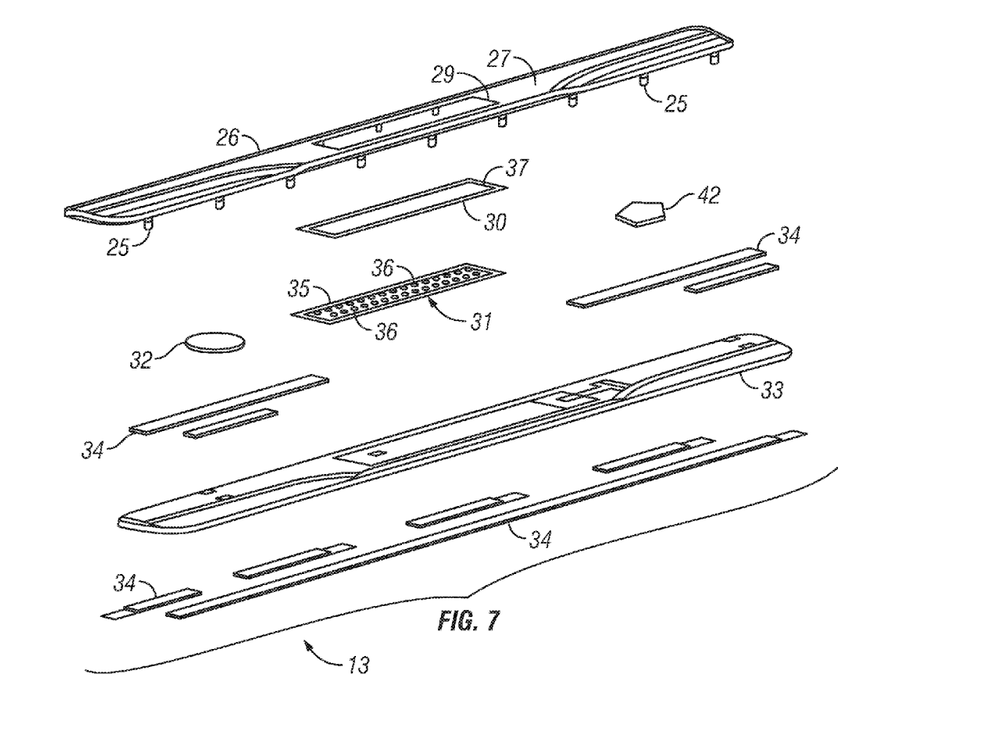
FIG. 7 is an exploded assembly view of the illumination assembly of FIG. 5.
Figure 8:
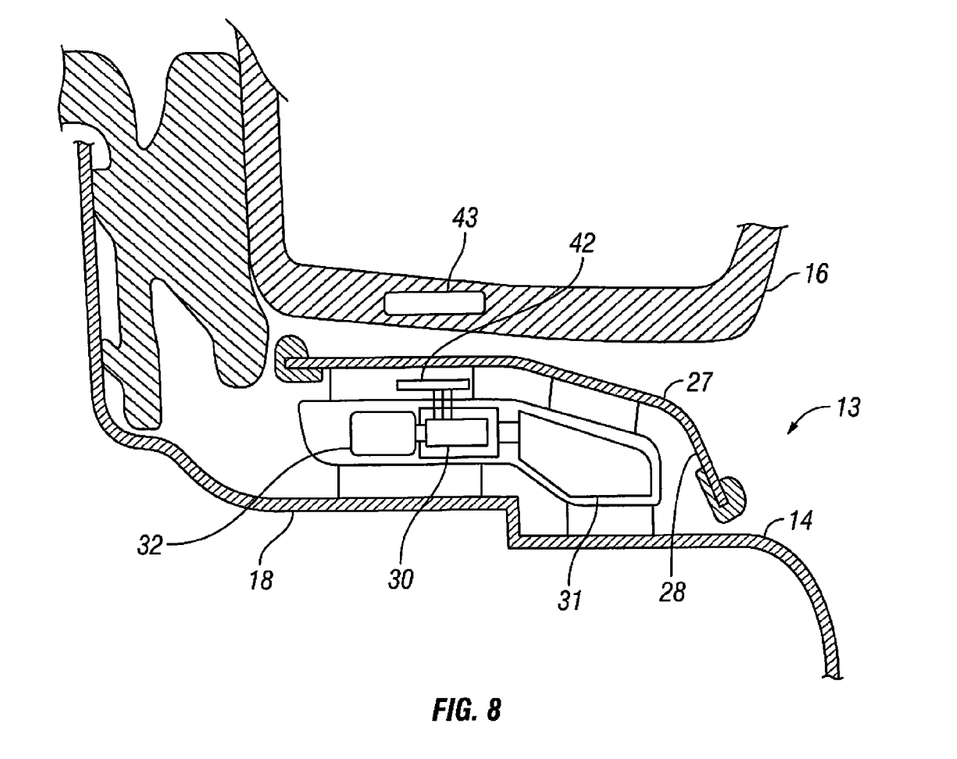
FIG. 8 is a cross-sectional view of the illumination assembly taken along lines 8-8 of FIG. 5.
Figure 9:
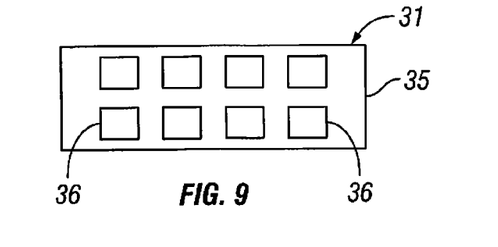
FIG. 9 is a top plan view of a microelectromechanical systems array.

The illumination assembly 13, as shown in FIGS. 5-8, includes an elongated sill protector (or kickplate) 26 having an upper surface 27 and a lower surface 28. The fasteners 25 extend downwardly from the lower surface to secure the illumination assembly 13 to the surface 14 of the sill structure 18. A window 29 extends through the sill protector from the upper surface 27 to the lower surface 28. An illumination member 30 is disposed beneath the window 29 to be visible therethrough, as shown in FIG. 5. An energy harvesting device 31 and a storage device 32 are disposed between the sill protector 26 and the surface 14 of the sill structure 18, as shown in FIG. 8. Alternatively, as shown in FIG. 7, a base member 33 can be connected between the sill protector 26 and the surface 14 of the sill structure to further protect the illumination member 30, the energy harvesting device 31 and the storage device 32 of the illumination assembly 13. A fastening member, such as adhesive tape 34, can be used to connect the illumination member 30, the energy harvesting device 31 and the storage device 32 to the sill protector 26 and the base member 33. A fastening member, such as adhesive tape 34, can be used to further secure the base member 33 to the surface 14 of the sill structure 18. The sill protector 26 is preferably made of stainless steel, although any suitable material can be used. The base member 33 is preferably made of polypropylene, although any suitable material can be used.

The energy harvesting device 31 can be any suitable energy harvesting device configured to convert ambient energy, such as vibration, heat, solar and radio frequency energy, to electrical energy. The energy harvesting device 31 described below is a microelectromechanical systems (MEMS) array 35, although such description applies equally to other types of energy harvesting devices.

Figure 10:
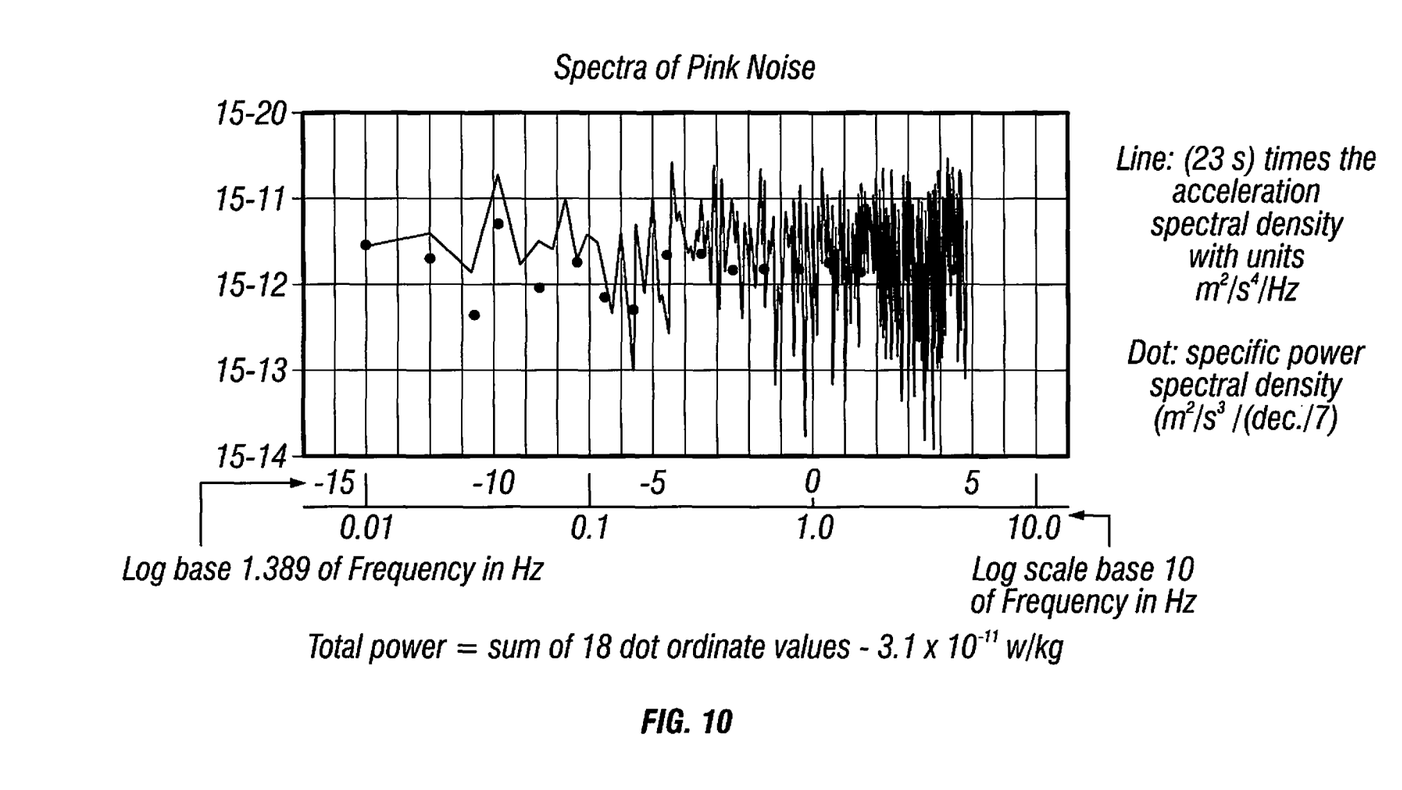
FIG. 10 is a graph of amplitude versus frequency of a vibration spectrum of an energy harvesting device connected to a vehicle.

The MEMS array 35 includes a plurality of MEMS 36, each of which is configured to be responsive to a predetermined vibration frequency bandwidth within which vibration typically occurs during operation of the vehicle 11. The MEMS 36 preferably comprise piezoelectric sensors. A frequency spectrum for a vehicle component, such as a sill structure 18 or the rear sill structure 21, is shown in FIG. 10. The MEMS 36 of the array 35 are selected such that the MEMS array 35 preferably covers a majority of the frequency spectrum of the component to which the illumination assembly 13 is connected. Additional MEMS 36 covering the same frequency bandwidth are selected for the portions of the spectrum in which the energy density is higher, such as between 0 and 5 of the graph of FIG. 10. Less MEMS 36 are used where the energy density is less, such as between 0 and −15. The MEMS 36 physically react to the vibration energy over the frequency spectrum configured to be covered by the MEMS 36, such as between −15 and 5 in FIG. 10, and generate electrical energy. By using a plurality of MEMS 35 directed to various frequency bandwidths, a greater amount of vibration energy can be harvested from the frequencies that fall within the overall MEMS frequency bandwidth. As the vibration energy changes with respect to the vehicle component and the specific location on the vehicle component, the frequency spectrum for a particular location of a particular vehicle component (FIG. 10) can be determined and the MEMS array 35 configured accordingly. The MEMS array 35 in accordance with an exemplary embodiment of the present invention allows vibration energy to be continuously harvested by the MEMS array 35 such that electrical energy is continuously supplied to a storage device 32. A plurality of illumination assemblies 13 can be disposed at various locations of the vehicle structure 12, such as the sill structures associated with each of the vehicle doors 16, including the rear hatch door 24.

Figure 11A:
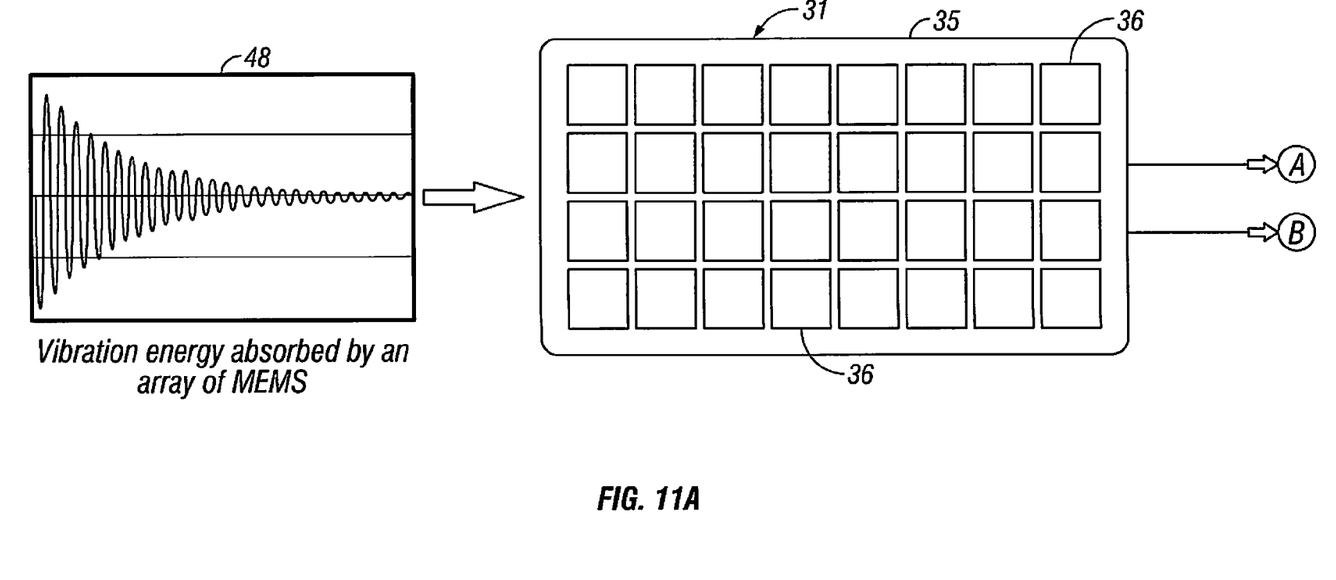
FIGS. 11A and 11B are an exemplary electrical circuit of the illumination assembly of FIG. 5.
Figure 11B:
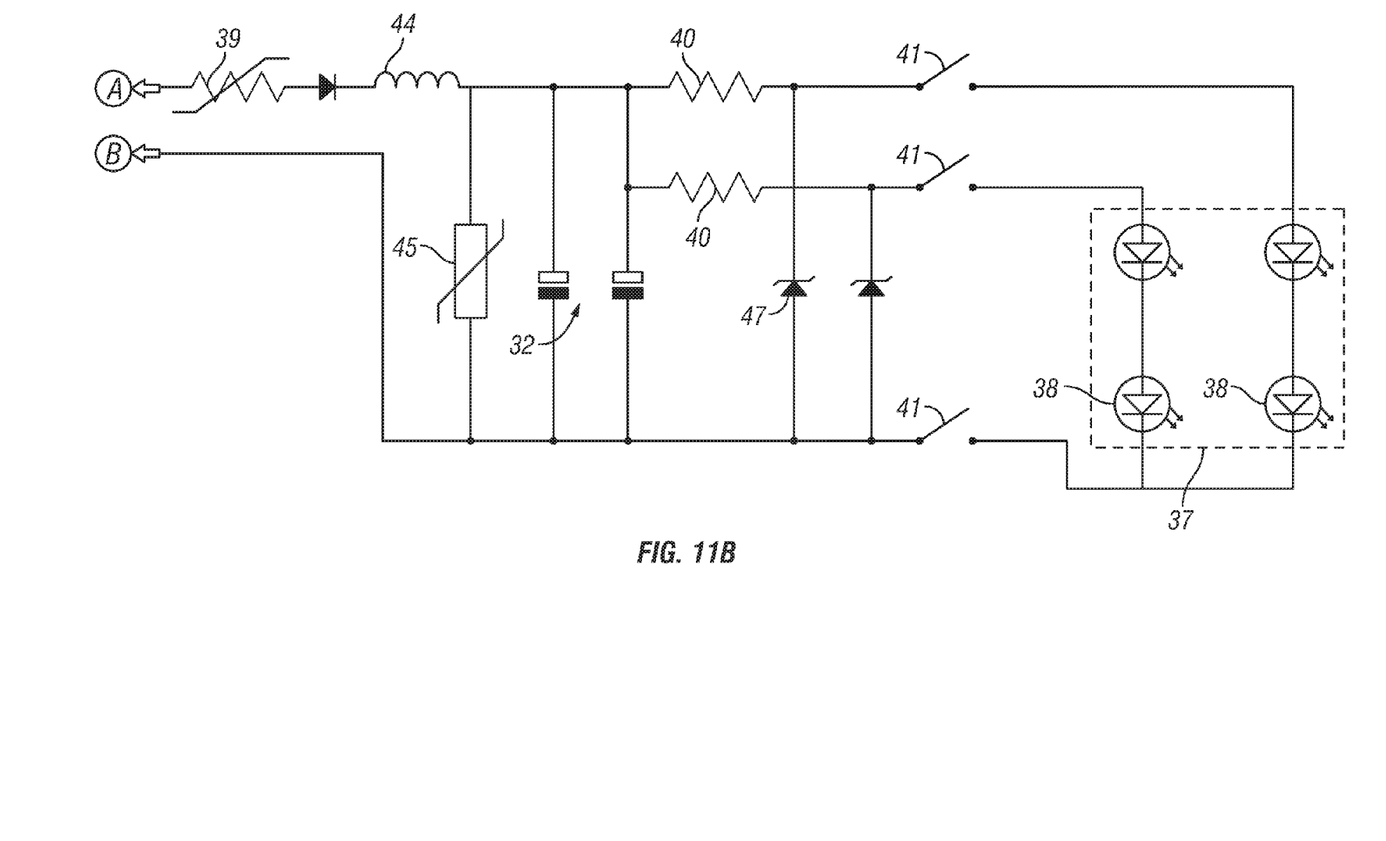

The storage device 32 is electrically connected to the MEMS array 35, as shown in FIGS. 8, 11A and 11B. The storage device 32 can be any suitable device for storing electrical energy, such as, but not limited to, super capacitors, small batteries, lithium-ion batteries, lithium-sulfur graphene batteries and regular batteries.

The illumination member 30 comprises a light emitting diode (LED) panel 37 electrically connected to the storage device 32, as shown in FIGS. 8, 11A and 11B. The LED panel 37 preferably includes a plurality of light emitting diodes (LEDs) 38, as shown in FIG. 11B. Any suitable LED 38 can be used, such as a clear LED, a color LED, or a combination thereof.

The illumination assembly 13 can include a variable resistor 39, as shown in FIG. 11B, to control a discharge rate of electrical energy from the storage device 32. The resistance value of resistors 40 in the electrical circuit is controlled by the variable resistor 39, such that the value can be set to discharge electrical energy from the storage device 32 at a desired rate.

Switches 41 (FIG. 11B) in the circuit are controlled by a sensor 42 disposed in the illumination assembly 13, as shown in FIG. 8. As shown in FIG. 11B, when the switches 41 are in an open position, electrical energy is prevented from being supplied from the storage device 32 to the LEDs 38. When the switches 41 are in a closed position, electrical energy is supplied from the storage device 32 to the LEDs 38, thereby illuminating the illumination member 30 of the illumination assembly 13.

The sensor 42 can be a magnetic sensor. A corresponding magnet 43 is connected to the closure panel 16, as shown in FIG. 8. When the closure panel 16 is closed (FIG. 1), the sensor 42 senses the magnet 43 and the switches 41 remain in the open position such that the illumination member 30 is not illuminated. When the closure panel 16 is opened (FIG. 2), the sensor 42 does not detect the magnet 43, thereby closing the switches 41 and illuminating the illumination member 30. Closing the closure panel 16, causes the sensor 42 to detect the magnet 43, thereby opening the switches 41 and stopping the supply of electrical energy to the LEDs 38 such that the illumination member 30 is no longer illuminated. Keeping the closure panel 16 in the open position causes electrical energy to be supplied from the storage device 32 until the storage device is discharged. The discharge rate can be controlled through the use of a variable resistor 39.

Alternatively, the sensor 42 can be a proximity sensor (e.g., a capacitance sensor) that is activated by movement of the closure panel 16 over the sensor, by movement of a hand over the sensor, or by touching or swiping the sensor. Such movement will cause the switches 41 to close, thereby illuminating the illumination member 30 of the illumination assembly 13. Repeating the movement causes the switches 41 to open, thereby stopping illumination of the illumination member 30.

As shown in the graph 48 of FIG. 11A, generated vibration energy is converted by the MEMS 36 into electrical energy. As the vibrations dampen (toward the right in the graph 48), less energy is harvested by the MEMS 36. The electrical energy harvested by the MEMS 36 is stored by the storage device 32. The sensor 42 causes electrical energy stored in the storage device 32 to be supplied to the illumination member 30, thereby illuminating the illumination member 30. As shown in FIG. 5, the illuminated illumination member 30 is visible through the window 29 in the sill protector 26. The illumination member 30 can include a logo 49, design or other pattern or indicium that is configured to be illuminated. Accordingly, a self-powered illumination assembly 13 is provided that is self-sufficient and does not drain any power from the vehicle's battery or another source of power.

An indicator 50 (see FIG. 4) can be disposed in the vehicle compartment 17 on a dashboard 51 or other suitable location. The indicator 50 is connected to the energy harvesting device 31 to indicate that the storage device 32 is being charged. Alternatively, the indicator 50 can indicate that the storage device is fully charged, that the energy harvesting device 31 is harvesting energy, or any other suitable status. The connection between the energy harvesting device 31 and the indicator 50 can be a wired connection or a wireless connection.

The illumination assembly 13 can also include a ferrite bead 44, as shown in FIG. 11B, configured to suppress high frequency noise in the circuit. Additionally, the circuit can include a transient suppressor 45 configured to protect the circuit from electrostatic discharge. Diodes 47 can be used in the circuit to allow electrical current to flow in only one direction, i.e., from the storage device 32 to the LEDs 38.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A self-powered illumination assembly for a vehicle, comprising:
    a microelectromechanical systems (MEMS) array connected to a vehicle structure and configured to convert vibration energy to electrical energy, the MEMS array including a plurality of sensors configured to harvest vibration energy from a plurality of frequency ranges, at least one sensor being configured to be responsive to a first vibration frequency bandwidth and at least one other sensor being configured to be responsive to a second vibration frequency bandwidth different from the first vibration frequency bandwidth;
    a storage device electrically connected to the MEMS array to store the electrical energy;
    an illumination member electrically connected to the storage device; and
    a proximity sensor connected to the MEMS array, the stored electrical energy being supplied to the illumination member by the storage device when activated by the proximity sensor.

2. The self-powered illumination assembly for a vehicle according to claim 1, further comprising
    a resistor electrically connected to the storage device configured to control a discharge rate of electrical energy from the storage device.

3. The self-powered illumination assembly for a vehicle according to claim 1, wherein
the MEMS array comprises a plurality of piezoelectric sensors.

4. The self-powered illumination assembly for a vehicle according to claim 1, wherein
a first number of sensors configured to be responsive to a first vibration frequency bandwidth is greater than a second number of sensors configured to be responsive to a second vibration frequency bandwidth.

* * * * *